Patented Aug. 14, 1945

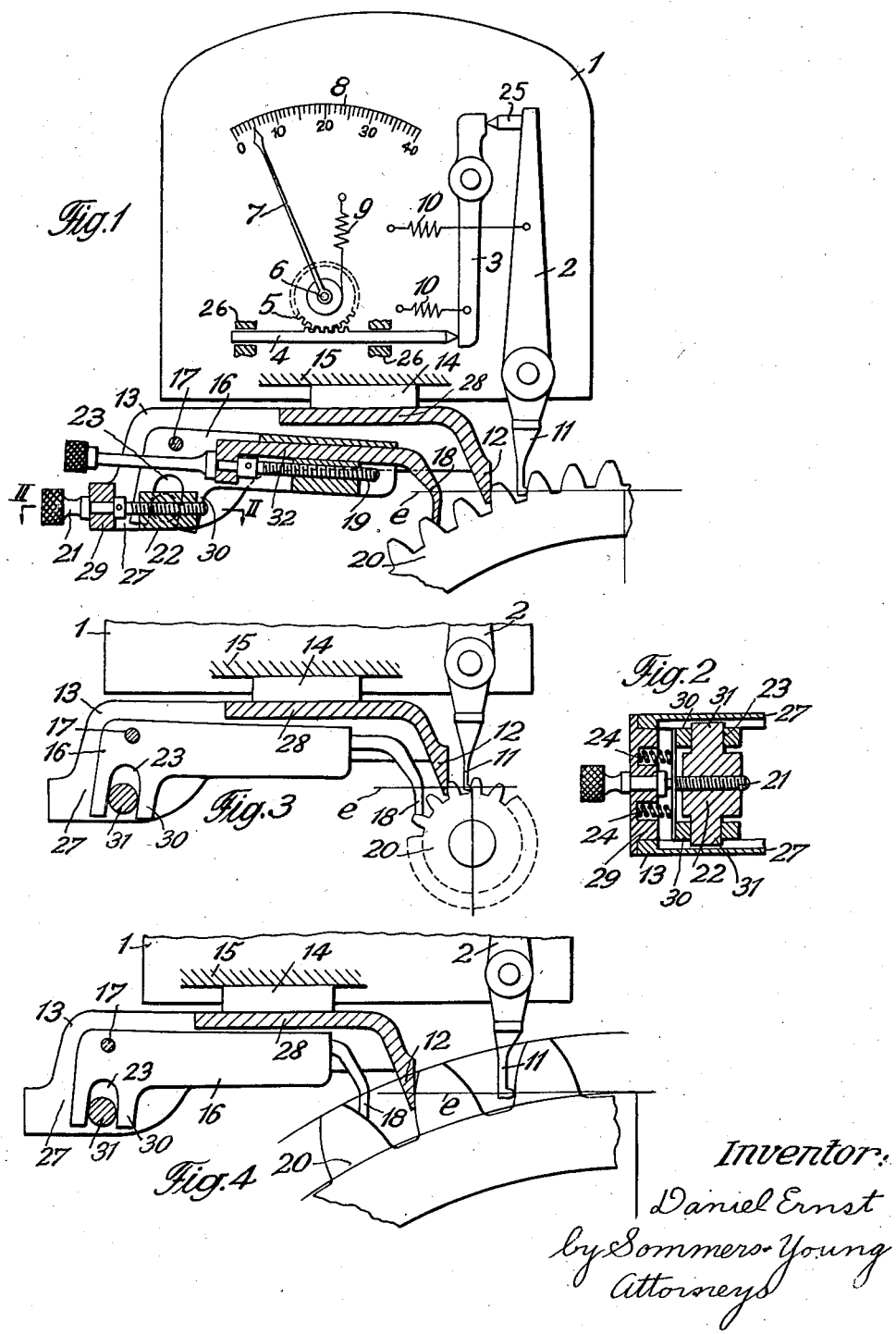

2,381,975

UNITED STATES PATENT OFFICE 2,381,975

APPARATUS FOR TESTING THE PITCH OF GEARS

Daniel Ernst, Zurich, Switzerland, assignor to Maag-Zahnräder und -Maschinen Aktiengesellschaft, Zurich, Switzerland Application December 7, 1943, Serial No. 513,281
In Germany July 8, 1942

2 Claims. (Cl. 33—179.5)

This invention relates to apparatus for testing the pitch of gears by contacting the flanks of the gear teeth by three members, viz. a movable and a stationary measuring member in conjunction with a counter holder. The latter serves the purpose of forcing the tooth flanks against the two measuring members at the required pressure and also guiding the testing apparatus relative to the gear. If gears having a small number of teeth and a small pitch are to be tested the two measuring members can readily be brought to bear against two consecutive tooth flanks whereas the supporting of the counter holder by one of the next following teeth, which owing to the sharp curvature of the pitch circle stand back to a great extent, meets with considerable difficulty.

The present invention has for its object a testing instrument comprising a counter holder the end of which for contacting with the tooth flank is adjustable in two directions that are approximately perpendicular to each other. By this means it is feasible to support the counter holder from the most appropriate of the succeeding tooth flanks in every practical case.

One embodiment of the invention representing by way of example an apparatus for testing the tooth pitch according to the same is illustrated in the accompanying drawing in which Fig. 1 shows a side view of the apparatus according to the invention partly in section;

Fig. 2 is a section on the line II—II in Fig. 1;

Fig. 3 shows a side elevation similar to that shown in Fig. 1 but with the parts in different positions of measuring, and Fig. 4 illustrates the parts in a further position of measuring.

On the base plate 1 (Fig. 1) a two-armed lever 2 is rotatably mounted the longer arm of which is held in bearing engagement with the upper shorter arm of a lever 3, under the pressure exerted on the first named arm by a tension spring 10 engaging therewith by means of a spacing piece 25. The latter lever is also mounted on the plate 1 and its lower longer arm leans against the end of a rack 4 under the pressure of a further tension spring 10, the rack being guided in a sliding guide 26 on the mounting plate 1 transversely to the lever 3. The rack 4 is engaged by a gear 5 rotatably arranged relative to the plate 1 and holding the pivot pin 6 of a pointer 7 which wipes over a scale for indicating thereon the measuring impulses imparted thereto by the lever 3. A tension spring 9 tends to turn the gear 5 so as to maintain the rack 4 in bearing engagement with the lever 3.

To the shorter end of the lever 2 a feeler member 11 is interchangeably secured the head of which contacts with the tooth flank to be tested, that is measured. Against the respective tooth flank of the adjacent tooth a measuring face 12, which is normally firmly secured to the base plate 1, bears in adjustable manner. This face is sustained by a carrier 13. A slideway 15 provided on the base plate 1 and extending transversely of the lever 2 displaceably guides a projection 14 on the carrier 13. By suitable means, not shown, this projection can be clamped in position at each point of the slideway 15. By this means the distance between the stationarily arrested measuring face 12 and the feeler member 11 can be adapted to the pitch existing in the tooth system to be tested.

The carrier 13 consists of two parallel stringers 27 (Fig. 2) which are rigidly united into a box like carrier frame by a web 28 and a block 29, the web ending in the face 12. This carrier frame supports a transverse axle 17 which is fastened in the stringers 27 and on which between the collateral stringers 27 a bell crank lever 16 is pivotally mounted. The depending arm of this bell crank lever consists of two forks 30 which straddle trunnions 31 on a block 22 (Fig. 2). This block is provided with a horizontal screw bore interengaging with a screw spindle 21. This spindle 21 is rotatably mounted in the block 29 of the carrier 13 and mounted so as to be secured against longitudinal displacement, by means of collars, and carries a head by rotation of which the lever 16 can be pivotally displaced. For the purpose of preventing any amount of play from arising between the carrier 13 and the bell crank lever 16 between the depending shanks of said lever and the block 29 compression springs 24 are intercalated.

Longitudinally of the horizontal arm of the bell crank lever 16 extends a sliding guide for receiving a bar 32, on the right hand end of which the depending counter holder 18 is arranged for bearing against the work. The bar 32 is fastened to the bell crank lever 16 so as to be displaceably guided in said slide guide. To this end a screw spindle 19 interengages with a screw bore of the lever 16 and is mounted in a projection of the arm 32 so as to be secured against displacement relative to said projection by means of collars, the screw spindle carrying a turn button by rotation of which the counter holder 18 can be adjusted longitudinally of the horizontal arm of the lever 16. By adjusting the carrier 13, that is, the normally stationary measuring face 12 to the tooth pitch, therefore, the counter holder 18 is at the same time moved approximately into the correct position.

Whereas Fig. 1 illustrates the testing of a gear of average tooth pitch and number of teeth, Figs. 3 and 4 show the application of the apparatus to a gear having a small pitch and number of teeth, and a large pitch and number of teeth respectively. Referring to the conditions shown in Fig. 4 the points at which the tooth flanks are contacted by the three members 11, 12 and 18 lie approximately in a straight line, that is, the line of action e. Further the tooth gaps are in this case so wide that the measuring face 12 and the counter holder 18 find room in one and the same tooth gap in which event the counter holder remains in its topmost position. If, however, the number of teeth of this gear would be small the carrier 16 would have to be swung far down together with the counter holder. In a wheel as shown in Fig. 3 the counter holder must engage into a third tooth gap, due to the small tooth pitch, and must be adjusted into a lower position commensurate with the curvature of the gear.

The invention is applicable also to apparatus for testing the pitch of gears of the type in which the apparatus is guided on the gear to be tested by any suitable means insofar as said apparatus requires a counter holder for urging the tooth flanks against the measuring members 11, 12.

I claim:

1. In apparatus for testing the pitch of the teeth of gears, a movable measuring member, an adjustable normally stationary measuring member coordinated with said movable measuring member for conjoint contacting engagement of said two members with the tooth system of a gear to be measured, a carrier for supporting said stationary measuring member, a counter holder for bearing engagement with the gear, a carrier for supporting said counter holder, means for shifting said counter holder relative to its said carrier, and means for pivotally mounting said counter holder carrier on said stationary measuring member carrier for pivotally displacing said counter holder relative to said stationary and said movable measuring member.

2. In apparatus for testing the pitch of the teeth of gears, a movable measuring member, an adjustable normally stationary measuring member coordinated with said movable measuring member for conjoint contacting engagement of said two members with the tooth system of a gear to be measured, a carrier for supporting said stationary measuring member, a counter holder for bearing engagement with the gear, a carrier for supporting said counter holder, means for shifting said counter holder relative to its said carrier, means for pivotally mounting said counter holder carrier on said stationary measuring member carrier for pivotally displacing said counter holder relative to said stationary and said movable measuring member, and spring means intercalated between said counter holder carrier and said stationary measuring member carrier for preventing play from arising between said two carriers.

DANIEL ERNST.